Patented Apr. 24, 1923.

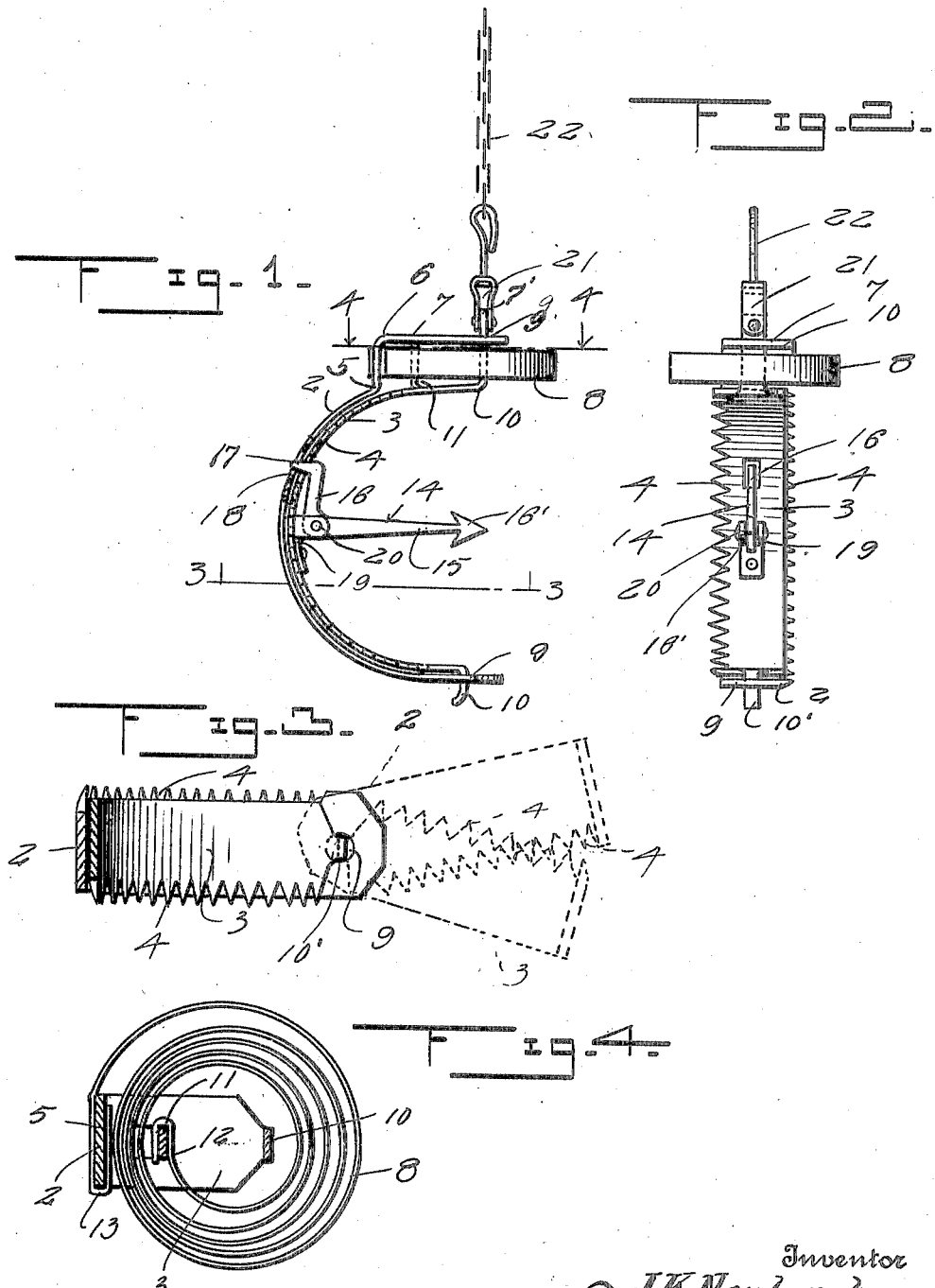

1,453,167

UNITED STATES PATENT OFFICE.

JOHAN KONRAD NORDENSTAM, OF STRATHCONA, MINNESOTA.

TRAP.

Application filed December 8, 1921. Serial No. 520,925.

*To all whom it may concern:*

Be it known that I, JOHAN KONRAD NORDENSTAM, a citizen of the United States, residing at Strathcona, in the county of Roseau and State of Minnesota, have invented certain new and useful Improvements in Traps; and I do hereby declare the following to be a full, clear, and exact description of the invention, such as will enable others skilled in the art to which it appertains to make and use the same.

This invention relates to traps and the primary object of the invention is to provide an improved trap, which can be suspended from a suitable support, and thereby making it impossible for animals to twist or gnaw the chain holding the trap in two.

Another object of the invention is to provide an improved trap having a pair of spring pressed jaws, which are held in a set position by means of a pivoted trigger or bait pin, which extends through registering apertures formed in the jaws.

A still further object of the invention is to provide an improved trap constructed of a minimum number of parts, which will be durable and efficient in use, one that is simple and easy to manufacture, and one that can be placed upon the market at a reasonable cost.

With these and other objects in view the invention consists in the novel construction, arrangement and formation of parts as will be hereinafter more specifically described, claimed and illustrated in the accompanying drawing forming a part thereof in which:

Figure 1 is a side elevation of the improved trap, showing the same in its set position, Figure 2 is a front elevation of the same, Figure 3 is a detail cross section taken on the line 3—3 of Figure 1, and Figure 4 is a detail cross section taken on the line 4—4 of Figure 1.

Referring to the drawings in detail, wherein similar reference numerals designate corresponding parts throughout the several views, the numeral generally indicates the improved trap, which includes a pair of substantially semi-circular jaws 2 and 3, which have teeth 4 formed on their opposite side edges.

The outer jaw 2 has the upper end thereof bent upwardly as at 5 and then forwardly as at 6, to provide an arm 7, which is spaced from the inner jaw member 3, and between the inner jaw member 3 and the outer jaw member 2, a flat coil spring 8 is positioned.

The outer ends of the outer jaw member 2 is provided with alined apertures 9 which are adapted to rotatably receive the reduced ends 10 of the inner jaw member 3, which are bent at right angles and extended through the same. By means of the reduced portions 10 of the inner jaw member, the jaws 2 and 3 are pivotally secured together. The inner jaw member 3 has an upstanding ear 11 struck out from the upper end thereof and the same has secured thereto the inner end 12 of the coil spring 8 and the outer end of the coil spring 8 is secured as at 13 to the inner portion 5 of the outer jaw. The coil spring 8 normally tends to swing the jaw members 2 and 3 together, so as to forcibly bring the teeth 4 of the same into the position shown in dotted lines in Figure 3 and a trigger 14 is provided for holding the jaws in their open position against the tension of the spring.

The trigger 14 includes a horizontal forwardly extending bait pin 15, which has its outer end sharpened as at 16 to facilitate the placing of the bait thereon and a vertical arm 16, which has its upper terminal bent rearwardly to form a shoulder 17, which is adapted to engage in registering apertures 18 formed in the jaws 2 and 3. The trigger 14 is pivoted at its angle to a pair of spaced ears 19 by means of a pivot pin 20. It can be seen that when the shoulder 17 is positioned in the registering apertures 18 the jaws are prevented from swinging on their pivots.

The upper reduced terminal 7' of the inner jaw 3 has pivotally connected thereto a swivel 21, which carries an attaching chain 22, by means of which the trap can be readily suspended from any suitable support.

In operation of the improved device the jaws 2 and 3 are swung against the tension of the coil spring 8 until the apertures 18 register and the trigger 14 is swung so as to position the shoulder 17 therein, which effectively holds the jaws in set position and any suitable bait is placed on the end of the bait pin 15 and when an animal trys to move the bait from the pin, the trigger will be swung on its pivot and the shoulder 17 will slide out of the registering apertures 18 and the jaws will be swung on their pivots and the teeth 4 will be brought into clamping relation with respect to each other and thus catch the animal therebetween.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What I claim as new is:

1. A trap comprising an inner and outer substantially semi-circular jaw, the outer jaw having the upper terminal thereof offset to form a spaced arm, a relatively flat coil spring positioned between the arm and the inner jaw member, means securing the terminals of the coil spring to the jaws, the outer jaw having registering apertures formed in the terminals thereof, the inner jaw having its terminals bent angularly and pivotally seated in said apertures, each of the jaws having an aperture formed therein arranged to register when the jaws are swung to their operative position against the tension of said spring, and a trigger carried by the inner jaw and arranged to fit in the registering apertures, as and for the purpose specified.

2. A trap comprising inner and outer jaws, the outer jaw having the upper terminal thereof offset to form a spaced arm, a tensioned spring positioned between the arm and the inner jaw member, said inner jaw member having an upstanding lug positioned in the space between the inner jaw and the arm, said tensioned spring having one of its terminals connected to said outer jaw and having its outer terminal connected to said lug, the outer jaw having registering apertures formed in the terminals thereof, the inner jaw having its terminals bent angularly and pivotally seated in said apertures, and a trigger mechanism for holding the jaws in operative position.

3. A trap comprising an inner and an outer substantially semi-circular jaw, the outer jaw having the upper terminals thereof offset to form a spaced arm, a relatively flat coil spring positioned between the arm and the inner jaw member, said inner jaw member having an upstanding lug, said coil spring having one terminal connected to said outer jaw and having its other terminal connected to said upstanding lug, the outer jaw having registering apertures formed in the terminals thereof, the inner jaw having its terminals bent angularly and pivotally seated in said apertures, each of the jaws having an aperture formed therein arranged to register when the jaws are swung to their operative position against the tension of said spring, and a trigger carried by the inner jaw and arranged to fit in registering apertures.

In testimony whereof I affix my signature in presence of two witnesses.

JOHAN KONRAD NORDENSTAM.

Witnesses:
G. I. BRANDT,
L. F. RANDOLPH, Jr.